United States Patent
Anderson et al.

(10) Patent No.: US 9,294,840 B1
(45) Date of Patent: Mar. 22, 2016

(54) EASE-OF-USE WIRELESS SPEAKERS

(75) Inventors: Jeffrey S. Anderson, Camas, WA (US);
Daniel J. DeFranco, Portland, OR (US);
Paul Loughnane, Vancouver, WA (US);
Frantz Lohier, El Cerrito, CA (US)

(73) Assignee: Logitech Europe S. A., Lausanne (CH)

( * ) Notice: Subject to any disclaimer, the term of this patent is extended or adjusted under 35 U.S.C. 154(b) by 682 days.

(21) Appl. No.: 12/972,376

(22) Filed: Dec. 17, 2010

(51) Int. Cl.
*H04R 5/02* (2006.01)
*H04R 1/26* (2006.01)
*H02J 7/00* (2006.01)

(52) U.S. Cl.
CPC .................. *H04R 5/02* (2013.01); *H02J 7/0042* (2013.01); *H04R 1/26* (2013.01)

(58) Field of Classification Search
CPC .......... H04R 1/1025; H04R 1/24; H04R 1/26; H04R 1/28; H04R 2201/028; H04R 5/02; H02J 7/0013; H02J 7/0042; H02J 7/0044; H02J 7/0045; H02J 7/0027
USPC ............... 381/77, 79–85, 300, 306, 307, 1, 2, 381/182, 150; 320/115, 114, 108, 103
See application file for complete search history.

(56) References Cited

U.S. PATENT DOCUMENTS

| 5,889,383 | A | * | 3/1999 | Teich | 320/107 |
| 5,973,591 | A | * | 10/1999 | Schwartz et al. | 340/384.7 |
| 6,509,716 | B2 | | 1/2003 | Yi | |
| 6,836,676 | B2 | | 12/2004 | Lloyd et al. | |
| 6,947,566 | B2 | * | 9/2005 | Mears | 381/75 |
| 7,548,040 | B2 | * | 6/2009 | Lee et al. | 320/108 |
| 7,620,195 | B2 | * | 11/2009 | Bengtsson et al. | 381/323 |
| 7,706,558 | B2 | * | 4/2010 | Sack et al. | 381/335 |
| 7,782,012 | B2 | * | 8/2010 | Jo | 320/115 |
| 8,126,182 | B2 | * | 2/2012 | Chang | 381/334 |
| 8,229,144 | B2 | * | 7/2012 | Hsu et al. | 381/311 |
| 8,638,957 | B2 | * | 1/2014 | Sim et al. | 381/182 |
| 2005/0008165 | A1 | * | 1/2005 | Sack et al. | 381/59 |
| 2006/0217162 | A1 | * | 9/2006 | Bodley et al. | 455/575.1 |
| 2007/0032274 | A1 | * | 2/2007 | Lee et al. | 455/575.2 |
| 2007/0291961 | A1 | * | 12/2007 | Shin | 381/111 |

(Continued)

FOREIGN PATENT DOCUMENTS

JP  2009071609 A  *  4/2009

OTHER PUBLICATIONS

Griffin Evolve Wireless Sound System for iPod: http://www.griffintechnology.com/products/evolve, 4 pages.
Homedics—Dock for iPod with Rechargeable Wireless Speaker System: http://www.ivgstores.com/IVG2/Y/ProductID-89093-.htm, 2003, 2 pages.
U.S. Appl. No. 12/717,781, filed Mar. 4, 2010, 33 pages.
PowerBeam: Products, http://www.powerbeaminc.com/products.php, 1 page, Oct. 20, 2010.

(Continued)

*Primary Examiner* — Vivian Chin
*Assistant Examiner* — Con P Tran
(74) *Attorney, Agent, or Firm* — Kilpatrick Townsend & Stockton LLP (57) ABSTRACT

One embodiment of the invention is directed to a speaker system comprising a first speaker apparatus comprising a housing, speaker components positioned substantially inside the housing and at least one first speaker apparatus charging member, wherein the speaker components include a power source, and a second speaker apparatus comprising a housing, speaker components positioned substantially inside the housing and at least one second speaker apparatus charging member. The first speaker apparatus and the second speaker apparatus are configured to each provide a different component of reproduced sound at the same time. The second speaker apparatus is configured to recharge the power source of the first speaker apparatus.

24 Claims, 10 Drawing Sheets

(56) References Cited

U.S. PATENT DOCUMENTS

| | | | |
|---|---|---|---|
| 2008/0019550 A1* | 1/2008 | Park et al. | 381/333 |
| 2008/0077261 A1* | 3/2008 | Baudino et al. | 700/94 |
| 2008/0095395 A1 | 4/2008 | Pieklik et al. | |
| 2008/0119241 A1* | 5/2008 | Dorogusker et al. | 455/573 |
| 2008/0137880 A1* | 6/2008 | Mills et al. | 381/79 |
| 2008/0157716 A1* | 7/2008 | Jo | 320/115 |
| 2008/0211458 A1* | 9/2008 | Lawther et al. | 320/132 |
| 2009/0180649 A1* | 7/2009 | Hsu et al. | 381/311 |
| 2009/0243433 A1 | 10/2009 | Dirr et al. | |
| 2009/0304214 A1* | 12/2009 | Xiang et al. | 381/307 |
| 2010/0008523 A1* | 1/2010 | Demuynck et al. | 381/182 |
| 2010/0215203 A1* | 8/2010 | Sip | 381/386 |
| 2011/0012555 A1* | 1/2011 | Jensen | 320/107 |
| 2011/0068742 A1* | 3/2011 | McCurry et al. | 320/114 |
| 2012/0121111 A1* | 5/2012 | Sim et al. | 381/182 |

OTHER PUBLICATIONS

PowerBeam: Technology—How PowerBeam works, http://www.powerbeaminc.com/how.php, 1 page, Oct. 20, 2010.

Wireless Speakers System Reviews: Add-on Modules for Surrond and Multiroom Audio, http://practical-home-theatre-guide.com/wireless-speakers.html, 7 pages, Sep. 29, 2010.

Dock for ipod with Rechargeable Wireless Speaker System—Homedics, http://www.ivgstores.com/IVG2/Y/ProductID-89093-.htm, 2 pages, Oct. 8, 2010.

The Music Ball—The Rechargeable wireless Speaker System!!!, http://member-6p011016c51e23860d.vox.com/library/post/gen-z-the . . . , 3 pages, Sep. 29, 2010.

Texas Electricity: Providing consumer information about electricity in Texas, http://www.electricity/bid.com/electricity/index.php/category/witricit . . . , 10 pages, Sep. 29, 2010.

* cited by examiner

EASE-OF-USE WIRELESS SPEAKERS

BACKGROUND OF THE INVENTION

The present invention relates to charging systems for wireless speakers.

Today, most people who buy a 5.1 surround-sound speaker system rarely set up and use the rear speakers because of the complexities in stringing the required signal wires to the rear of the listening/viewing area and installing the rear speakers. Solutions have been developed where the rear speakers receive the audio signal through wireless means. But these solutions still have short-comings in that those wireless rear speakers still need to be plugged in to AC wall power, or they run on batteries which may deplete at inopportune times if the user fails to maintain the battery.

Technology advances have created "virtual surround" solutions where advanced signal processing technologies are used to simulate surround-sound from only a front set of speakers. These solutions are acceptable for some people, but they still fall short of the performance and experience that may be achieved with a pair of rear surround sound speakers placed behind or to the side of the listening position.

Some examples of prior art related to speakers and chargers are as follows. U.S. Pat. No. 6,509,716 and U.S. Pat. No. 6,836,676 show a cell phone charger that becomes a speakerphone when the cell phone is charging. U.S. Pat. No. 7,548,040 describes wirelessly charging a speaker using inductive coupling.

Embodiments of the invention address these and other problems individually and collectively.

BRIEF SUMMARY OF THE INVENTION

Embodiments of the invention are directed to systems, apparatuses, and methods for charging a wireless speaker from a wired speaker.

One embodiment of the invention is directed to a speaker system comprising a first speaker apparatus comprising a housing, speaker components positioned substantially inside the housing and at least one first speaker apparatus charging member, wherein the speaker components include a power source, and a second speaker apparatus comprising a housing, speaker components positioned substantially inside the housing and at least one second speaker apparatus charging member. The first speaker apparatus and the second speaker apparatus are configured to each provide a different component of reproduced sound at the same time. The second speaker apparatus is configured to recharge the power source of the first speaker apparatus.

Another embodiment of the invention is directed to a method comprising determining, by a processor, whether a trigger event has occurred in the speaker system. The speaker system comprises a first speaker apparatus and a second speaker apparatus wherein the second speaker apparatus is configured to recharge the power source of the first speaker apparatus. In response to the determination that the trigger event has occurred, reconfiguring signal processing to the first speaker apparatus so that the first speaker apparatus receives the appropriate signal based on the trigger event.

These and other embodiments of the invention are described in further detail below.

DETAILED DESCRIPTION OF THE INVENTION

Some embodiments of the invention provide the ability to re-charge wireless speakers by docking them onto another speaker. Some embodiments of the invention provide the ability to power wireless speakers by wireless means.

In one embodiment of the invention, a set of re-chargeable wireless speakers may be docked onto other (e.g., front) speakers. When the wireless speakers are docked onto the front speakers they may provide sound that is complementary/additive to the front speakers. For example, the wireless speakers that are docked onto the front speakers may duplicate the front sound or may be configured for a virtual surround solution. An exemplary virtual surround sound solution is described in U.S. application Ser. No. 12/717,781, filed on Mar. 4, 2010, the entire contents of which are herein incorporated by reference. While the wireless speakers are docked, the internal batteries may be charged by electronics embedded into the front speakers. The front speakers may be stationary speakers with a power plug. When the user decides that he wants an uncompromised surround experience, he may un-dock the wireless surround speakers from the front speakers and place them at any convenient location behind his listening position for an actual surround sound experience. The wireless speakers will then operate in one embodiment using power provided by the charged battery, and receiving a signal via wireless means (e.g., radio frequency (RF), Infrared (IR), etc). When the user is done and/or the speaker batteries are depleted, the user may place the speakers back on the front-speaker-dock. In one embodiment, the speakers or a control module in the speaker system may provide an indication or notification to the user that the speaker batteries are low or depleted.

Figure 1:
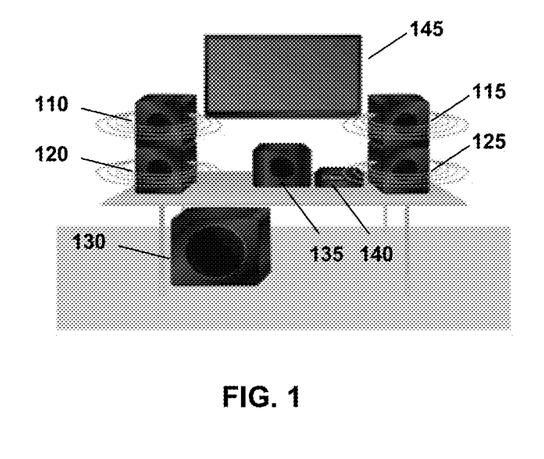
FIG. 1 shows a diagram of a speaker system according to an embodiment of the invention.

FIG. 1 shows a system that may be used in an embodiment of the invention. FIG. 1 includes a pair of stereo speakers, one on each side of a video display unit 145. The pair of stereo speakers are comprised of two units, a bottom speaker 120 or 125 that may be stationary, and a top unit that is removable—the docked wireless speaker 110 or 115. The bottom speaker 120 and 125 may be used as a front speaker. For most stereo listening cases, both top and bottom speakers of the stereo pair may be providing the sound. Speakers 110 and 115 will be referred to as wireless speakers, removable wireless speakers, or top speakers throughout this application, however, it is understood that these speaker can be used for a variety of purposes and sound configurations (e.g., auxiliary speakers, surround sound speakers, a second set of speakers, etc.).

Figure 9:
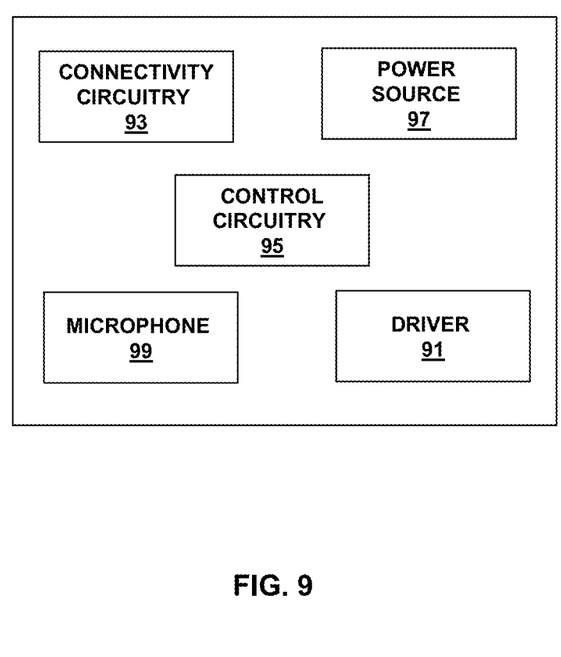
FIG. 9 shows a block diagram of a speaker according to an embodiment of the invention.

The system in FIG. 1 may further include a center speaker 135 and a subwoofer 130. The speakers described throughout this application may comprise a housing and speaker components positioned substantially within the housing. As shown in FIG. 9, exemplary speaker components may include at least one driver 91, control circuitry 95, connectivity circuitry 93, and a power source 97. The power source 97 may include a battery, and/or circuitry to connect to an external power source (e.g., an electric outlet). The driver 91 can refer to a device that converts electrical signals from an electrical source into sound for a listener. The speaker components may optionally include a microphone 99.

The speaker system may also include a control module. A control module is configured to control settings of the speaker system. For example, the control module may have volume control interfaces for a source device such as a television, iPod, etc. This allows the user to control the volume and settings of the speaker system.

Figure 8:
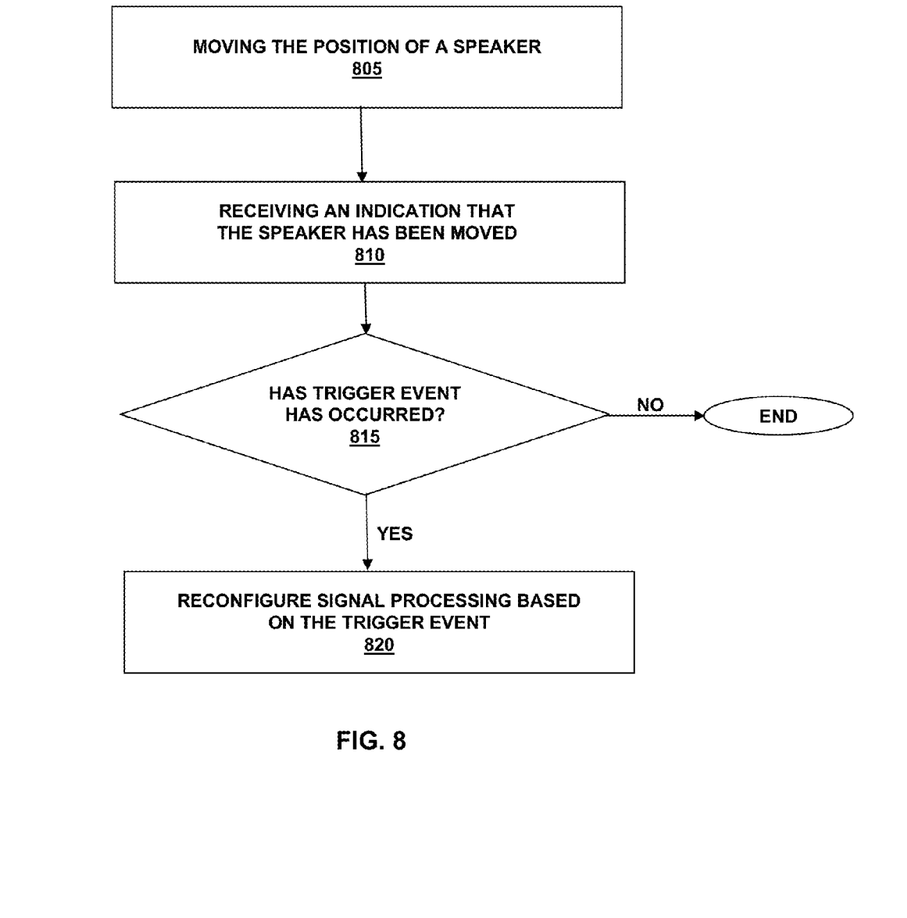
FIG. 8 shows a flowchart illustrating steps in a method according to an embodiment of the invention.

The control module may be a separate component (e.g., a control box 140), or may be a component embedded in one or more speakers in the system. For example, the control module may be embedded within a center speaker 135, or a right speaker 125. Alternately, the control module may be embedded in some other component of an entertainment center, such as a set-top box, a television, a receiver, a bridge, etc. The control module may be controlled via a remote control. The control module may comprise a processor (e.g., a digital signal processor) capable of determining whether or not a trigger event has occurred. As shown in FIG. 8, a user may move the position of the speaker (step 805). The control module may receive an indication that the speaker has been moved (step 810). It is to be noted that in various embodiments, steps 805 and 810 are optional. In accordance with one embodiment, the control module may then determine whether a trigger event has occurred (step 815). For instance, in one embodiment, the trigger event may be the docking or un-docking of the removable wireless speaker 110 or 115, and the control module may receive a signal from the bottom speaker 120 or 125 indicating the remote speaker 110 or 115 is either docked or undocked (e.g., engaged or disengaged with bottom speaker 120 or 125). In one embodiment, the trigger event is the position/direction of the docked wireless speaker relative to the position of the front speaker, and the control module is capable of detecting the position of the speaker and the direction the speaker is facing. Yet another example of a trigger event is the remote speakers being moved to another location. Still another example of a trigger event is receiving an incoming call, or initiating an outgoing call. Detection of any of these trigger events may result in different sound signals being directed to the remote speakers (e.g., reconfiguring signal processing based on the trigger event as shown in FIG. 8, step 820). These aspects are further discussed below.

As mentioned above, in one embodiment, the control module may automatically detect that the removable wireless speakers 110 or 115 have been docked or undocked. The control module may detect that the removable wireless speaker(s) are docked or undocked by a variety of mechanisms, such as a mechanical switch, or a switch that is tripped when current flows through the contact members. Based on the determination, the control module may configure the speakers with the appropriate sound output. For example, when control module detects that the removable wireless speakers 110 or 115 have been docked, it may configure the removable wireless speakers 110 or 115 to produce audio that is complementary to the bottom speakers 120 or 125 (e.g., front stereo audio content). When the control module detects that the removable wireless speakers 110 or 115 have been undocked, the control module may configure the removable wireless speakers 110 or 115 to produce surround audio content. For example, the control module may reconfigure the signal processing such that the speaker may receive the appropriate signal for the condition.

Figure 5:
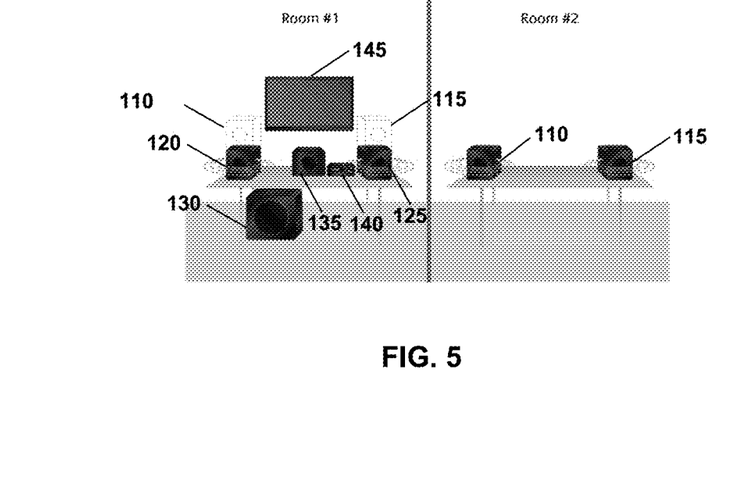
FIG. 5 shows a diagram of a speaker system in two different rooms according to an embodiment of the invention.

A user may also use the control module to configure the removable wireless speakers 110 or 115 depending on how the user wants to use the removable wireless speakers 110 or 115. For example, the user may desire to place the removable wireless speakers in a remote location and have them produce the sound that he desires. This may include normal stereo sound or surround sound, etc. It may also be an entirely different source than what the main speakers are playing. For example, FIG. 5 shows the speaker system in two different rooms. In Room #1 the speakers may be receiving a television signal and in Room #2 the receivers may be receiving a signal from a different source such as an iPod. In this example, one user may be watching television in Room #1 with speakers and another user may be listening to his iPod in Room #2. Thus, the removable wireless speakers 110 and 115 may be unlinked from the main system and then linked to another source (e.g., iPod, iPad, etc.) directly. A user may use his mobile device (e.g., iPod, iPhone, iPad, etc.) and control the audio completely separate from the main system. Alternatively, the system may automatically switch the audio source to the other audio source when the removable wireless speakers 110 and 115 are moved to a different location and/or near the other audio source. The removable wireless speakers may be outputting audio from a second input source to the main speaker system (e.g., the main speakers are outputting from a TV source and the removable wireless speakers are outputting audio from a second source input to the main speaker system).

There are a variety of ways in which a removable wireless speaker 110 or 115 may be engaged with or docked/connected onto bottom speakers 120 or 125. For example, each removable wireless speaker 110 or 115 may include at least once contact member on the housing of the removable wireless speaker 110 or 115, and each bottom speaker 120 or 125 may include at least one contact member on the housing of the bottom speaker 120 or 125. The at least one contact member may be located on the bottom of each removable wireless speakers 110 or 115 and the at least one contact member may be located on the top of each bottom speaker 120 or 125. A removable wireless speaker 110 or 115 may be engaged with or docked/connected to a bottom speaker 120 or 125 via the at least one contact member located on the removable wireless speaker 110 or 115 and the at least one contact member located on the bottom speaker 120 or 125.

In various embodiments, power can be transferred between two components (e.g., speakers) using charging members which can either be contact members or contactless members. Examples of contact members include pressure contacts that make contact when the removable wireless speaker 110 or 115 is placed on top of the bottom speaker 120 or 125. Other examples of contact members include a plug (e.g., a power plug, a plugged in USB cable, etc.). Examples of contactless members are induction coils or other near field contactless technologies. An example of a contactless technology is inductive charging mechanism which includes two coils that when located next to each other will transfer energy between them. With an inductive charging mechanism, it is possible so there is no metal contact at all and thus, there is no concern about rust and corrosion. The charging mechanism may be encased in plastic or other material of the housing.

When docked, the removable wireless speaker 110 or 115 may optionally be secured in place by, for example, a slide, snap or removable hinge. However, it is not necessary to be secured. Simply placing a removable wireless speaker 110 or 115 on top of a bottom speaker 120 or 125 may be sufficient to create the appropriate electrical interface between the two so that the removable wireless speaker 110 or 115 may charge. For customer convenience, divots may be used to help the speakers stay centered when docked.

Figure 2:
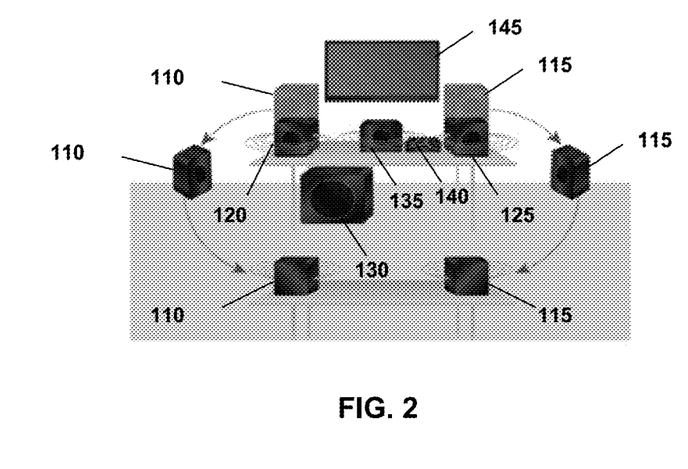
FIG. 2 shows a diagram of a speaker system with removable speakers being removed and placed in a different location according to an embodiment of the invention.

When the user desires uncompromised surround audio, the user may remove (e.g., un-dock) the top speakers 110 and 115 from the bottom and place them at any convenient location behind his listening environment, as shown in FIG. 2. When undocked, the wireless speakers may receive the audio signal by wireless means (e.g., RF, IR or any wireless technology). The speaker system control module may automatically detect that the wireless speakers 110 and/or 115 have been un-docked and may automatically configure them to receive surround audio content rather than front stereo audio content, as described above.

When the user is done with this audio experience, he may replace (e.g., dock) the removable wireless speakers 110 and 115 back onto the bottom speakers 120 and 125. While docked, the speaker control module and bottom speakers 120 and 125 may provide a charge voltage and current, through electrical contacts or contactless technologies, to charge the wireless speaker's batteries. While docked, the speaker system control module may send front audio signals to the docked speakers 110 and 115 so that those speakers may output audio that is complementary to the bottom speakers 120 and 125 (e.g., duplicative or configured for virtual surround).

The removable wireless speakers 110 and 115 may be designed to dock in assorted configurations to provide the user with flexible listening experiences. Some examples are shown in FIGS. 3-5.

Figure 3:
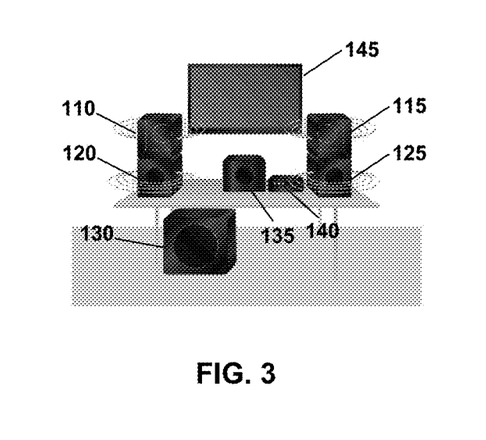
FIG. 3 shows a diagram of a speaker system with removable speakers facing backwards according to an embodiment of the invention.

FIG. 3 shows a removable wireless speaker 110 and a removable wireless speaker 115 docked such that the driver is facing backwards from the listener. This provides a different sound field configuration than if the removable wireless speakers 110 and 115 were aimed forward. Thus, instead of the drivers of the removable wireless speakers 110 and 115 facing forward towards the listener, the drivers are actually facing backwards, away from the listener (e.g., the front of the speaker is facing backwards). In this configuration, the speaker system may provide a "360 degree" sound experience. To provide this sound experience, the control module may detect that the removable wireless speakers 110 and 115 have been placed on top of the bottom speakers 120 and 125 in a backwards position, and thus provide the appropriate signal processing for that configuration. The control module may detect the position of the speakers by a variety of mechanisms. For example, the bottom speakers 120 and 125 may have multiple engagement points associated with different switches which are activated depending on which direction the speaker is facing when placed on top of the bottom speakers 120 and 125.

Figure 4:
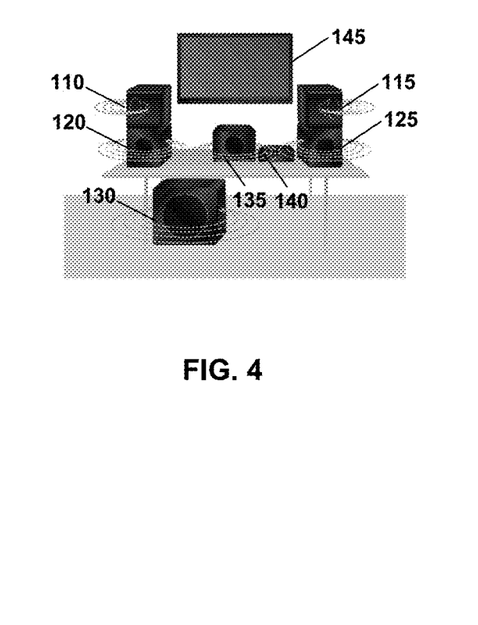
FIG. 4 shows a diagram of a speaker system with removable speakers facing outwards according to an embodiment of the invention.

FIG. 4 shows a removable wireless speaker 110 and a removable wireless speaker 115 docked with the drivers facing 90 degrees outward from the listener. Thus, instead of the driver facing forward towards the listener, the driver for the removable wireless speaker 110 is facing to the left of the listener and the driver for the removable wireless speaker 115 is facing to the right of the listener. In this configuration, a virtual surround or enhanced stereo experience may be had.

The removable wireless speakers 110 and 115 may also face upwards to provide yet another listening experience. Various other positions/configurations are also possible, and the specific configurations discussed herein are merely illustrative examples.

The speaker system control module may detect this mode, as described above, and provide a processed signal to the speakers that take advantage of the direction the speakers are facing to optimize the virtual surround or enhanced stereo acoustic output.

FIG. 5 shows how the removable wireless speakers 110 and 115 may be used as remote speakers in different rooms and/or outdoors, as described above, to allow for multi-zone functionality and modality. In one embodiment, the removable wireless speakers 110 and 115 are used as "party speakers", where the sound present in the first room is shared with/extended/carried out to another location (e.g., the backyard). In such an embodiment, the audio source for the bottom speakers 120 and 125 and the removable wireless speakers 110 and 115 may be the same. In another embodiment, the removable wireless speakers 110 and 115 are used as a different set of speakers, where the audio source for these speakers is different from the audio source for the bottom speakers 120 and 125. For example, the bottom speakers 120 and 125 may get audio from a TV program, while the removable wireless speakers 110 and 115 may get audio from a music player (e.g., an iPod), another TV, or any other media appliance. The removable wireless speakers may be outputting audio from a second input source to the main speaker system (e.g., the main speakers are outputting from a TV source and the removable wireless speakers are outputting audio from a second source input to the main speaker system).

In yet another embodiment, a microphone may be embedded within one or all wireless speakers. In such an embodiment, one or both removable wireless speakers 110 and 115 may receive audio from an incoming call. As an example scenario, several users may be watching a TV program, with the removable wireless speakers 110 and 115 in a docked position. An incoming call may be received using any calling/chat application that may be integrated into the entertainment system (e.g., a set-top box, a bridge, a gaming console connected to the internet, etc.). One of the users may then undock the removable wireless speakers 110 and 115, receive and transmit the audio for the call using the removable wireless speakers 110 and 115, and go into another room to conduct the call, while the other users continue to watch the TV program using the bottom speakers 120 and 125. In another example scenario, one or more microphones may be embedded into one or both of the removable wireless speakers. A user could then use the docked or undocked removable wireless speaker(s) and use them as a speakerphone with a Google TV or television with conferencing capabilities.

It is to be noted that any or all of these various embodiments are combinable into a single embodiment, and that one or more wireless speakers may be equipped to do all of the above. Also, it is to be noted that in one embodiment, the user may manually select the audio source and/or configuration/mode to be used for the wireless speakers. In another embodiment, one or more trigger events may automatically switch the audio source and/or configuration. Examples of trigger events include undocking and/or docking of the wireless speakers, moving the wireless speakers to another location, moving the wireless speakers in/out of the vicinity of a specified media appliance, an incoming call (or accepting an incoming call), and so on. For instance, when an incoming call is received, the wireless speakers may automatically switch to the audio for that call. This may happened regardless of whether they are docked or undocked at the time the call is received. In one embodiment, the user can configure the trigger events, their priorities, and how the audio sources and/or configurations are to be switched, etc. Such trigger events, their priorities and the corresponding configurations/ modes etc. may be stored in the control module, which is described in more detail elsewhere.

Figure 6:
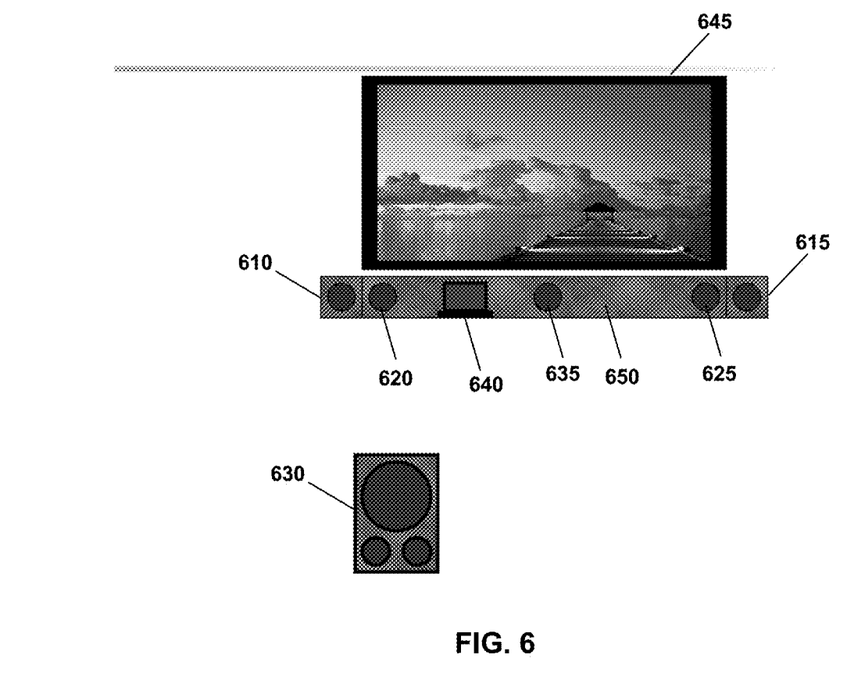
FIG. 6 shows a diagram of a speaker system according to an embodiment of the invention.

FIG. 6 shows a system according to an embodiment of the invention. The speakers shown in FIG. 6 may be configured in a "sound-bar" configuration. Speakers of the sound-bar configuration are becoming more popular since they provide a simpler set up than discrete speaker systems, and they may be more aesthetic when paired with modern flat-screen video monitors. Embodiments of the invention may be even more beneficial to the user when used in a sound-bar format. The sound bar format may provide the best simplicity for set-up by the user. A typical sound-bar has no wiring between the speakers and simple connectivity to the source device, such as the TV set. The single box unit and the simplicity of set-up is particularly appealing to today's consumer As shown in FIG. 6, the removable wireless speaker 610 and 615 may dock on the two ends of a sound bar speaker 650. The sound bar speaker 650 may include a left and right speaker 620 and 625, a center speaker 635 and a control module 640. In addition, the system in FIG. 6 may include a video display until 645 and a subwoofer 630. The subwoofer may be wireless.

Figure 7:
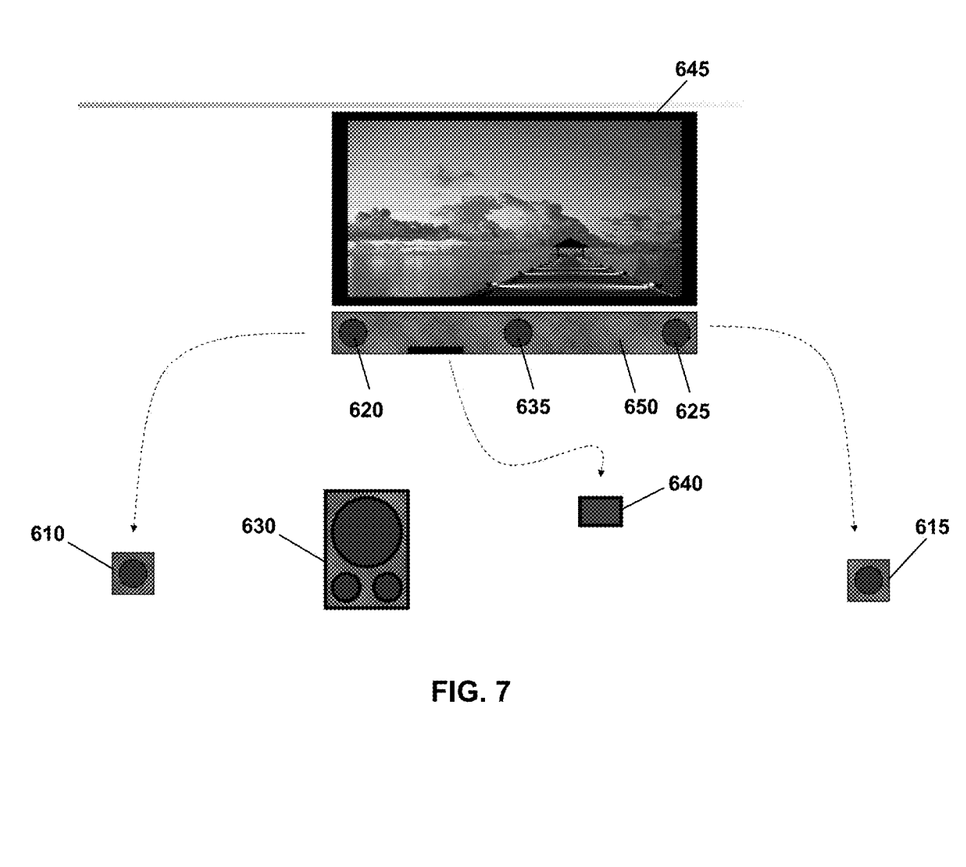
FIG. 7 shows a diagram of a speaker system with removable speakers being removed and placed in a different location according to an embodiment of the invention.

The control module 640 may be a component embedded in the sound bar or removable from the sound bar 650 (e.g., see FIG. 7). In some embodiments, the control module 640 may be a remote control or other mobile device (e.g., touch pad, mobile phone, iPod, iPad, etc.). As described above, the control module 640 may detect the state of the removable wireless speakers 610 and 615 and provide the appropriate signal to those removable wireless speakers 610 and 615. In this configuration, the docked wireless speakers 610 and 615 may output sound that is additive to the stereo output of the fixed speakers in the sound bar 650. Additionally, the speaker system control module may provide an audio signal to the docked speakers 610 and 615 that may create an enhanced stereo or virtual surround acoustic output. The horizontal physical alignment of all the loudspeaker drivers in the sound-bar format are particularly conducive to modern signal processing algorithms that provide virtual surround sound audio (similar to what is described in U.S. patent application Ser. No. 12/717,781).

Figure 10:
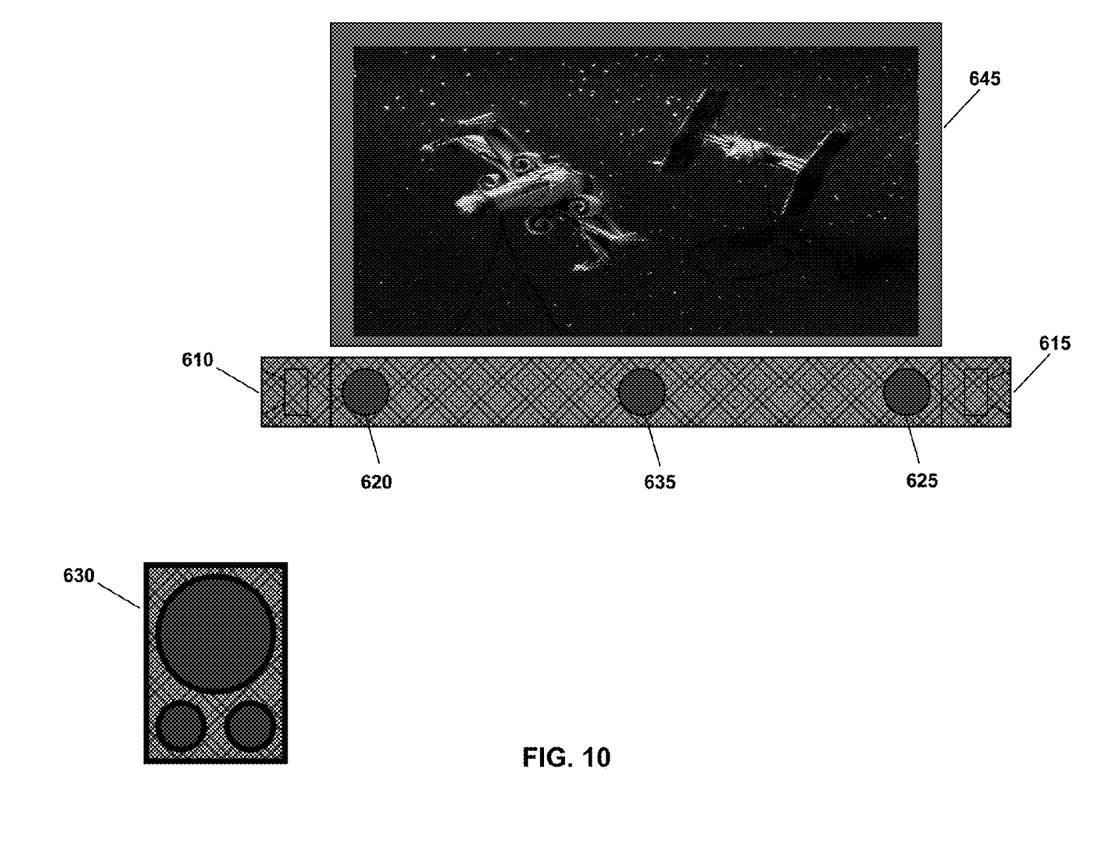
FIG. 10 shows a block diagram of a speaker system according to an embodiment of the invention.

As shown in FIG. 6, the removable wireless speakers 610 and 615 are facing forward. Another configuration may have the docking speakers configured such that when docked, the drivers may fire out the horizontal ends of the bar providing another acoustic mechanism for enhanced audio and/or virtual surround (e.g., the front of the removable wireless speaker 610 may face to the left and the front of the removable wireless speaker 615 may face to the right as shown in FIG. 10). In yet another configuration the removable wireless speakers 610 and 615 may face backwards for a 360 sound field, for example, when the speaker system is used on a table top rather than mounted against the wall. The removable wireless speakers 610 and 615 may also face upwards or downwards to provide yet another listening experience. As described above, the control module may comprise a processor (e.g., a digital signal processor) capable of receiving a signal indicating the remote speaker 610 or 615 is either docked or undocked and capable of detecting the position of the speaker and the direction the speaker is facing.

When the user desires uncompromised surround-sound, he may simply undock the removable wireless speakers 610 and 615 from the ends of the sound-bar and place them at convenient locations behind the listening position as shown in FIG. 7. The speaker system control module may detect that the removable wireless speakers 610 and 615 have been removed from the sound bar and may reconfigure so that surround audio signal is then sent to the undocked wireless speakers, as described above.

When the user is done with this audio experience, he may replace (dock) the rear wireless speakers 610 and 615 back onto the sound bar speaker 650. While docked, the speaker control module and speakers 650 may provide a charge voltage and current, through electrical contacts or contactless technologies, to charge the wireless speaker's batteries. While docked, the speaker system control module may send appropriate stereo, enhanced stereo, or virtual surround audio signals to the docked speakers 610 and 615 so that those speakers may output audio that is complementary to the sound bar speaker 650, as described above.

When docked, the removable wireless speaker 610 or 615 may optionally be secured in place by, for example, a slide, snap, magnets, or removable hinge. For example, if the sound bar is hanging on a wall, it may be desirable to have the remote wireless speakers secured in some way. However, it is not necessary to be secured.

The wireless speaker(s) may also be used in various other modes (e.g., a "party mode," etc.) as remote speaker(s) in another room or outdoors, as described above and shown in FIG. 5.

In some use cases or products, it may be more desirable to have the wireless surround speakers dock separately from the speakers. A self-standing dock that may be placed in any convenient location may be used. Such a self standing dock may be hidden away in a cabinet. Another convenient charge dock location may be the subwoofer. The subwoofer may deploy a charging dock location for the wireless speakers. If the removable wireless speakers are docked on the subwoofer, they may be used to strengthen or supplement the subwoofer sound. Another embodiment may be to use two subwoofers that are meant to be located to the left rear and right rear of the listening position. Each subwoofer may contain a dock for the wireless surround speaker and may be used to provide a surround experience while docked, and an enhanced surround or remote speaker experience when undocked.

Embodiments of the invention allow for all of the speakers in the system be wireless or some be wireless and some wired. In addition, more or fewer speakers and other components may or may not be part of the overall system. Furthermore, some speakers may be fixed speakers, but any (or all) of the speakers described herein may be speakers whose positions and locations may be changed. In addition, embodiments of the invention may allow for more than two wireless speakers be used in the described ways. For example, a 7.1 surround audio experience could be had by deploying two pairs of wireless speakers. For example, in the configuration of FIG. 1, there may be a stack of two wireless speakers docked onto stationary speakers 120 and 125. In the configuration of FIG. 6, there may be two wireless speakers daisy-chained on each end of the sound-bar.

In another embodiment of the invention, the wireless speaker(s) may wirelessly receive power directly and/or wirelessly receive power to re-charge battery power or other energy storage device such as a super capacitor. In some product use cases, it may be more desirable to permanently install speakers in a fixed location rather them dock them periodically. In such a case, the wireless speaker may not only receive a wireless audio signal, it may also receive power through wireless means. The following embodiments describe different ways to do this.

In one embodiment of the invention, a wireless speaker may obtain power through optical power. A wireless speaker may obtain the power to operate the internal electronics through converting light or electromagnetic energy in the light spectrum into power. Such methods include solar panels and collated or laser light energy.

Solar panels that convert ambient light or sun light energy into electrical energy may be used to charge a battery and/or directly operate the electronics. For example, the speaker housing itself may be contain solar panels and may collect light from the room where they reside. In another example, a set of solar panels separate from the speaker housing could be deployed. If desired, light energy may also be aimed at the solar panels by using spot lights that are located anywhere in the room. With the advancements in solar technology, it may be possible that very little light would be necessary to provide sufficient energy to power the speakers or charge a battery in the speakers.

Collated or laser light energy that is emitted from a source projector, transmitter, or radiator maybe be directed at or aimed at a receiver on the wireless speaker and used to charge a battery and/or directly operate the electronics. For example, the source light energy transmitters may be mounted in the front of a room on a sound bar or television set and aimed at rear speakers in the rear of the room. Or, the source light energy transmitters may be mounted on the floor of a room and aimed upwards towards a wall mounted speaker that has optical light receivers mounted on the bottom surface. The source light energy transmitters may be located at any convenient location in the room and aimed at the wireless speakers. The aimed light energy may be visible light or light energy that is not visible to the human eye.

The installation and aiming process may be aided by the use of visible laser pointers embedded in the power transmitter. The user, when installing the system, may aim the transmitter laser dot at the rear speaker receivers and lock down that position through typical mechanical means. Another enhancement would be to use motorized mirror controlled by an electronic controller system. The motorized mirror may be used to aim the light energy beam by the user with a remote control. Or the motorized mechanism may scan the room in a pattern until the beam strikes the remote speakers. Once the beam strikes the remote speakers, the speakers may send a signal back to the controller to lock that position.

Should there be a comfort or safety concern when using high energy collated or laser light transmitter, a safety mechanism may be deployed wherein the wireless speaker may sense a dark condition or break in the light path (e.g., a human standing in front of the transmitter) and transmit a signal back to the transmitter to shut off the light energy transmitter. The transmitter may strobe (at very low duty cycle), or use a low energy light. Once the wireless speaker begins to receive the light strobe or low energy light, the controller inside the wireless speaker may assume that the light path is now clear and send a signal to the transmitter to resume a full power transmission.

In an embodiment of the invention, a wireless speaker may obtain power through magnetic induction coupled power. A wireless speaker may obtain the power to operate the internal electronics through magnetic induction coupling. Such methods include a receiver coil in or on the wireless speaker that receives electromagnetic waves from a transmitter coil that is located some distance from the wireless speaker. The wireless speaker converts that energy into power that operates the internal electronics and/or charges a battery. Examples of magnetic coupled energy include WiTricity technology. The source magnetic induction energy transmitter coils may be mounted in the front of a room on the sound bar or television set and designed to project the energy to rear speakers in the rear of the room. Or, the source magnetic induction transmitter coils may be mounted on the floor of a room and aimed upwards towards a wall mounted speaker that has magnetic induction receivers embedded and configured to receive the electromagnetic energy. The source energy transmitters may be located at any convenient location in the room and aimed at the wireless speakers.

In one embodiment of the invention, a wireless speaker may obtain power through radio frequency (RF) energy. A wireless speaker may obtain the power to operate the internal electronics through converting radio frequency electromagnetic energy. Such methods include a radio frequency energy transmitter that may be placed in proximity of the wireless speaker and radiates RF energy that is received by a receiver embedded in the wireless speaker (e.g., the transmitter may be separate from or embedded in the sound bar or another speaker component). The wireless speaker converts that energy into power that operates the internal electronics and/or charge a battery. The transmitter and receiver may use omnidirectional antenna, or they may use directional antenna (or arrays or dish) that may be aimed at each other to achieve maximum power transfer efficiency.

Embodiments may further include radio frequency energy receivers embedded in the wireless speaker that scavenge energy that is present in the environment. The wireless speaker converts that energy into power that operates the internal electronics and/or charge a battery.

In one embodiment of the invention, a wireless speaker may obtain power through acoustical or vibration energy. A wireless speaker may obtain the power to operate the internal electronics through converting acoustic sound into energy that may charge the wireless speaker's batteries. Such methods include an acoustic transmitter or radiator may be located in the room and configured such that it radiates energy into the room or directed at the wireless speaker. An acoustic receiver in the wireless speaker receives the acoustic energy and converts that into power. This may be of ultrasonic energy—acoustic energy above human hearing. In such a case, an ultrasonic receiver device may be used in the wireless speaker, or the wireless speaker system's loudspeaker transducer may be used. In the latter, the acoustic system may contain acoustic tuning to maximize the efficiency of the acoustic reception and power conversion. This may be of ultra low frequency energy—acoustic energy that in which the energy is below the threshold of human hearing in frequency and/or amplitude. The wireless speaker system's loudspeaker transducer may be used as the acoustic energy receiver. In this case, the acoustic system may be tuned to maximize the efficiency of the acoustic reception and power conversion. The audio system subwoofer may be used as the low-frequency acoustic energy transmitter.

Other methods include utilizing a wireless speaker system's transducer to pick up ambient noise in the environment and convert that into energy to charge the wireless speaker system's battery. The acoustic system of the wireless speaker, or a secondary acoustic system installed in the wireless speaker system may be used to scavenge acoustic energy in the environment and convert that into power to recharge the wireless speaker's batteries.

In embodiments of the invention, wireless speakers may utilize high density energy storage or energy generation technology. The wireless speaker system may be designed with ultra high efficiency electronics and acoustics such that high density power storage devices, such as alkaline, lithium, or lead acid batteries, provide enough power to operate the speaker for long periods of time. This provides the user with long run-times before the batteries may be depleted and need to be replaced or charged.

The wireless speaker system may be designed with ultra high efficiency electronics and acoustics. The wireless speaker system may utilize energy generation technology, such as fuel-cell technology, that provide enough power to operate the speaker for long periods of time. This provides the user with long run-times before the energy generation device may need to be refueled or replaced.

Embodiments of the invention describe the use of technologies that may extend the playtime life of the wireless speaker to indefinite, allowing the user to permanently or semi-permanently place the wireless speakers at the desired listening locations without needing to dock the speaker for recharge. Such well optimized technologies and system design may complement or even negate the requirement for the charging function of a dock.

Although embodiments of the invention described are focused on technologies and solutions for the application of surround-sound speakers, it should be obvious to the reader that these technologies may be applied to wireless speakers utilized in other applications as well.

Embodiments of the invention provide a number of advantages. For example, embodiments of the invention address shortcomings in wireless speakers that need to be plugged into AC wall power or run on batteries that need to be replaced by allowing a user to recharge the wireless speaker by docking the speaker onto another speaker in the speaker system. Thus, the user not only has a simple solution for charging the wireless speaker but also has the flexibility of moving the speaker around as desired. In addition, the system does not need to have a separate docking component but can use existing components of the stereo system.

Furthermore, embodiments of the invention allow the user to to benefit from the output of the speaker while docked, and also benefit from the numerous sound configurations (e.g., stereo sound, surround sound, etc.) with the wireless speaker.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A speaker system comprising:
a first speaker apparatus comprising:
a housing,
speaker components positioned substantially inside the housing, and
at least one first speaker apparatus charging member on the housing, wherein the speaker components include a power source; and
a second speaker apparatus comprising:
a housing,
speaker components positioned substantially inside the housing, and
at least one second speaker apparatus charging member on the housing;
the first speaker apparatus and the second speaker apparatus are configured to each provide a different component of reproduced sound at the same time;
the first speaker apparatus configured to engage with the second speaker apparatus via the at least one first speaker apparatus charging member on the housing of the first speaker apparatus and the at least one second speaker apparatus charging member on the housing of the second speaker apparatus;
the second speaker apparatus configured to recharge the power source of the first speaker apparatus when the at least one first speaker apparatus charging member on the housing of the first speaker apparatus is engaged with the at least one second speaker apparatus charging member on the housing of the second speaker apparatus;
the first speaker apparatus is further configured to provide complementary audio to the second speaker apparatus when the first speaker apparatus is engaged with the second speaker apparatus via the at least one first speaker apparatus charging member on the housing of the first speaker apparatus and the at least one second speaker apparatus charging member on the housing of the second speaker apparatus.

2. The speaker system of claim 1 wherein complementary audio includes virtual surround sound.

3. The speaker system of claim 1 wherein the first speaker apparatus is further configured to provide surround sound when the first speaker apparatus is not engaged with the second speaker apparatus.

4. The speaker system of claim 1 further comprising a control module configured to control settings of the speaker system.

5. The speaker system of claim 4 wherein the control module is configured to detect when the first speaker apparatus is engaged with the second speaker apparatus.

6. The speaker system of claim 5 wherein the control module is further configured to detect a direction the first speaker apparatus is facing relative to the second speaker apparatus.

7. The speaker system of claim 4 wherein the speaker components of the second speaker apparatus further comprise the control module.

8. The speaker system of claim 4 wherein the control module is further configured to automatically switch a first audio source to a second audio source when the first speaker apparatus is moved to a location near the second audio source.

9. The speaker system of claim 1 wherein the power source is a battery.

10. The speaker system of claim 1 wherein the at least one first speaker apparatus charging member is a pressure contact, a plug, or a near field contactless technology.

11. The speaker system of claim 1 wherein the first speaker apparatus further comprises a connector to secure the first speaker apparatus to the second speaker apparatus.

12. The speaker system of claim 11 wherein the connector is a slide, snap, or removable hinge.

13. The speaker system of claim 1 further comprising:
a third speaker apparatus comprising a housing, speaker components positioned substantially inside the housing and at least one third speaker apparatus charging member on the housing, wherein the speaker components include a power source; and a fourth speaker apparatus comprising a housing, speaker components positioned substantially inside the housing and at least one fourth speaker apparatus charging member on the housing;

the third speaker apparatus configured to engage with the fourth speaker apparatus via the at least one third speaker apparatus charging member and the at least one fourth speaker apparatus charging member;

the fourth speaker apparatus configured to recharge the power source of the first speaker apparatus when engaged with the first speaker apparatus.

14. The speaker system of claim 1 further comprising:
a third speaker apparatus comprising a housing, speaker components positioned substantially inside the housing and at least one third speaker apparatus charging member on the housing, wherein the speaker components include a power source;

the second speaker apparatus further comprising an additional second speaker apparatus charging member;

the third speaker apparatus configured to engage with the second speaker apparatus via the additional second speaker apparatus charging member and the at least one third speaker apparatus charging member.

15. The speaker system of claim 1 wherein the speaker components positioned substantially inside the housing of the first speaker system further include a microphone and wherein the first speaker is further configured to receive audio from an incoming call.

16. The speaker system of claim 1 wherein the first speaker apparatus is configured to be linked to a first audio source and the second speaker apparatus is configured to be linked to a second audio source wherein the first source and the second source are not the same location.

17. The speaker system of claim 1 further comprising:
the first speaker apparatus and the second speaker apparatus are configured to provide a virtual surround solution when the first speaker apparatus is engaged with the second speaker apparatus via the at least one first speaker apparatus charging member on the housing of the first speaker apparatus and the at least one second speaker apparatus charging member on the housing of the second speaker apparatus.

18. A method for detecting a trigger event in a speaker system comprising:
determining, by a processor, whether the trigger event has occurred in the speaker system wherein the speaker system comprises a first speaker apparatus comprising a housing, speaker components positioned substantially within the housing, and at least one first speaker apparatus charging member on the housing, wherein the speaker components include a power source, and a second speaker apparatus comprising a housing and at least one second speaker apparatus charging member on the housing, wherein the second speaker apparatus is configured to recharge the power source of the first speaker apparatus when the at least one first speaker apparatus charging member on the housing of the first speaker apparatus is engaged with the at least one second speaker apparatus charging member on the housing of the second speaker apparatus, wherein the first speaker apparatus and the second speaker apparatus are configured to each provide a different component of reproduced sound at the same time, and wherein the first speaker apparatus is further configured to provide complementary audio to the second speaker apparatus when the first speaker apparatus is engaged with the second speaker apparatus via the at least one first speaker apparatus charging member on the housing of the first speaker apparatus and the at least one second speaker apparatus charging member on the housing of the second speaker apparatus; and in response to the determination that the trigger event has occurred, reconfiguring signal processing to the first speaker apparatus so that the first speaker apparatus receives the appropriate signal based on the trigger event.

19. The method of claim 18 wherein the trigger event is that the first speaker apparatus has been engaged with the second speaker apparatus via the at least one first speaker apparatus charging member on the housing of the first speaker apparatus and the at least one second speaker apparatus charging member on the housing of the second speaker apparatus and the appropriate signal based on the trigger event includes a signal to produce audio in a form that is complementary to the second speaker apparatus.

20. The method of claim 18 wherein the trigger event is that the first speaker apparatus is disengaged from the second speaker apparatus and the appropriate signal based on the trigger event includes a signal to produce surround audio content.

21. The method of claim 18 wherein the trigger event is the direction that the first speaker apparatus is facing.

22. The method of claim 18 wherein the trigger event is the first speaker apparatus being moved from a first location to a second location.

23. The method of claim 18 wherein the trigger event is an incoming call.

24. The method of claim 18 wherein the trigger event and the appropriate signal based on the trigger event is configured by a user.

* * * * *